(12) United States Patent
Michel et al.

(10) Patent No.: US 11,782,936 B2
(45) Date of Patent: Oct. 10, 2023

(54) ENTITY DATA ATTRIBUTION USING DISPARATE DATA SETS

(71) Applicant: Palantir Technologies Inc., Palo Alto, CA (US)

(72) Inventors: Jean-Baptiste Michel, Brooklyn, NY (US); Alan Hampton, Piedmont, CA (US); Ananya Shukla, New York City, NY (US); I.K. Ashok Sivakumar, Baltimore, MD (US)

(73) Assignee: Palantir Technologies Inc., Denver, CO (US)

( * ) Notice: Subject to any disclaimer, the term of this patent is extended or adjusted under 35 U.S.C. 154(b) by 134 days.

(21) Appl. No.: 17/159,510

(22) Filed: Jan. 27, 2021

(65) Prior Publication Data
US 2021/0224266 A1  Jul. 22, 2021

Related U.S. Application Data

(63) Continuation of application No. 16/209,763, filed on Dec. 4, 2018, now Pat. No. 10,942,935, which is a
(Continued)

(51) Int. Cl.
*G06F 16/2458* (2019.01)
*G06F 16/22* (2019.01)
(Continued)

(52) U.S. Cl.
CPC .......... *G06F 16/2462* (2019.01); *G06F 16/22* (2019.01); *G06F 16/335* (2019.01); *G06N 7/01* (2023.01)

(58) Field of Classification Search
CPC .... G06F 16/2462; G06F 16/22; G06F 16/335; G06N 7/005; G06N 7/01
(Continued)

(56) References Cited

U.S. PATENT DOCUMENTS 5,991,758 A * 11/1999 Ellard ............... G06F 16/24558
6,212,529 B1    4/2001 Boothby et al.
(Continued)

FOREIGN PATENT DOCUMENTS

EP          3176710 A1     6/2017
WO    WO-2008092147 A2    7/2008

OTHER PUBLICATIONS

Microsoft Computer Dictionary, 5th Edition, Microsoft Press, Redmond, WA, © 2002, p. 141.*
(Continued)

*Primary Examiner* — Robert Stevens
(74) *Attorney, Agent, or Firm* — Faegre Drinker Biddle & Reath LLP

(57) ABSTRACT

Systems and methods for using disparate data sets to attribute data to an entity are disclosed. Disparate data sets can be obtained from a variety of data sources. The disclosed systems and methods can obtain a first and second data set. Trajectories can represent multiple data records in a data set associated with an entity. Trajectories from the obtained data sets can be used to associate data stored among the various data sets. The association can be based on the agreement between the trajectories. The associated data records can further be used to associate the entities related to the associated data records.

17 Claims, 7 Drawing Sheets

Related U.S. Application Data continuation of application No. 15/209,544, filed on Jul. 13, 2016, now Pat. No. 10,223,429.

(60) Provisional application No. 62/261,744, filed on Dec. 1, 2015.

(51) Int. Cl.
*G06F 16/335* (2019.01)
*G06N 7/01* (2023.01)

(58) Field of Classification Search
USPC .......................................................... 707/769
See application file for complete search history.

(56) References Cited

U.S. PATENT DOCUMENTS

| | | | |
|---|---|---|---|
| 6,853,997 B2 | 2/2005 | Wotring et al. | |
| 7,020,651 B2 | 3/2006 | Ripley | |
| 7,149,746 B2 | 12/2006 | Fagin et al. | |
| 7,181,734 B2 | 2/2007 | Swamy et al. | |
| 7,209,911 B2 | 4/2007 | Boothby et al. | |
| 7,490,112 B1 | 2/2009 | Suresh et al. | |
| 7,899,796 B1 | 3/2011 | Borthwick et al. | |
| 7,949,639 B2 | 5/2011 | Hunt et al. | |
| 8,307,012 B2 | 11/2012 | Thomas | |
| 8,386,499 B2 | 2/2013 | Martinez et al. | |
| 8,452,816 B1 | 5/2013 | Goudreau, Jr. et al. | |
| 9,262,503 B2 | 2/2016 | Hunt et al. | |
| 9,347,779 B1* | 5/2016 | Lynch | G01S 19/393 |
| 9,514,167 B2 | 12/2016 | Yakout et al. | |
| 9,626,685 B2 | 4/2017 | Martinez et al. | |
| 10,942,935 B2 | 3/2021 | Michel | |
| 2008/0162580 A1 | 7/2008 | Ben Harush | |
| 2010/0045799 A1* | 2/2010 | Lei | G06V 40/103 |
| | | | 348/739 |
| 2013/0246342 A1 | 9/2013 | Faith et al. | |
| 2014/0052685 A1 | 2/2014 | Adair et al. | |
| 2014/0067875 A1 | 3/2014 | Martinez et al. | |
| 2014/0201043 A1 | 7/2014 | Arditi et al. | |
| 2014/0279299 A1* | 9/2014 | Erenrich | G06Q 40/02 |
| | | | 705/30 |
| 2014/0279942 A1 | 9/2014 | Siepmann et al. | |
| 2014/0330845 A1* | 11/2014 | Feldschuh | G06F 16/215 |
| | | | 707/749 |
| 2014/0351012 A1 | 11/2014 | Jernigan | |
| 2014/0379806 A1 | 12/2014 | Zhang et al. | |
| 2015/0006559 A1 | 1/2015 | Meierhoefer et al. | |
| 2015/0186909 A1 | 7/2015 | Malgatti et al. | |
| 2016/0146617 A1* | 5/2016 | Macfarlane | G01C 21/3815 |
| | | | 701/532 |
| 2016/0171113 A1 | 6/2016 | Fanous et al. | |
| 2016/0171508 A1 | 6/2016 | Fanous et al. | |
| 2016/0224996 A1 | 8/2016 | Hunt et al. | |
| 2016/0253679 A1* | 9/2016 | Venkatraman | G06Q 30/0185 |
| | | | 705/310 |
| 2017/0154082 A1 | 6/2017 | Michel et al. | |
| 2019/0108173 A1 | 4/2019 | Michel et al. | |

OTHER PUBLICATIONS

Li, Yanhua, et al., "Sampling Big Trajectory", CIKM '15, Melbourne, Australia, Oct. 19-23, 2015, pp. 941-950.*

"U.S. Appl. No. 15/209,544, First Action Interview—Pre-Interview Communication dated May 22, 2018", 4 pages.

"U.S. Appl. No. 16/209,763, Notice of Allowance dated Oct. 30, 2020", 9 pages.

"European Application Serial No. 16201733.9, Extended European Search Report dated Feb. 27, 2017", 9 pgs.

Bilenko, Mikhail, et al., "Adaptive Blocking: Learning to Scale Up Record Linkage", ICDM Hong Kong, China, (Dec. 18-22, 2006,), 87-96.

Fagin, Ronald, et al., "Clio: Schema Mapping Creation and Data Exchange", Conceptual Modeling: Foundations and Applications, LNCS 5600, Springer-Verlag, Berlin, (2009), 39 pages.

Fahrner, Christian, et al., "A survey of database design transformations based on the Entity-Relationship model", Data & Knowledge Engineering, vol. 15, Issue 3, Elsevier Science B.V, (Jun. 1995), 38 pages.

Mohamed, Yakout, et al., "Behavior based record linkage", [ACM Digital Library], Assoc. of Computing Machinery, New York, NY, vol. 3, No. 1-2, (Sep. 1, 2010), 439-448.

Pathak, Jyotishman, et al., "Normalization and standardization of electronic health records for high-throughput phenotyping: the SHARPn consortium", Journal of the American Medical Informatics Association, vol. 20, Issue e2, (Dec. 2013), e341-e348.

* cited by examiner

| Number | Consuming Entity ID (e.g., name or code) | Consuming Entity Location ||||  Provisioning Entity ID (e.g., name or code) | Provisioning Entity Location |||| Type of Provisioning Entity (e.g., name or code) | Interaction Amount (e.g., in Dollars) | Time of Interaction ||
|---|---|---|---|---|---|---|---|---|---|---|---|---|---|---|
| | | State | City | Zip Code | Street Address | | State | City | Zip Code | Street Address | | | Date | Time |
| 1 | User 1 | California | Palo Alto | 94304 | 123 Main St | PE001 | California | Palo Alto | 94304 | 234 University Ave | Gas Station | 74.56 | 2013/11/23 | 10:32 |
| 2 | CE002 | California | Sunnyvale | 94085 | 123 Murphy St | Merchant 2 | Unknown | Unknown | Unknown | Unknown | Supermarket | 23.56 | 2013/10/15 | 11:23 |
| 3 | User 1 | California | Palo Alto | 94304 | 123 Main St | Merchant 2 | Unknown | Unknown | Unknown | Unknown | TPE123 | 32.11 | 2013/11/21 | 19:00 |
| 4 | User 3 | California | San Francisco | 94102 | 1000 Lombard St | Merchant 3 | California | San Francisco | 94102 | 123 Market St | Coffee Shop | 8.97 | 2013/10/20 | 17:05 |
| 5 | User 3 | Unknown | Unknown | Unknown | Unknown | Merchant 3 | California | San Francisco | 94102 | 123 Market St | Coffee Shop | 5.34 | 2013/11/03 | 8:03 |
| ... | ... | ... | ... | ... | ... | ... | ... | ... | ... | ... | ... | ... | ... | ... |
| 50,000,000,000 | User N | California | Beverly Hills | 90210 | 123 Wilshire Blvd | Merchant N | California | Beverly Hills | 90210 | 789 Wilshire Blvd | TPE789 | 89.23 | 2013/10/28 | 14:00 |

FIG. 4

| Number | Identifier | \multicolumn{6}{c|}{Location} | \multicolumn{2}{c|}{Time} |
|---|---|---|---|---|---|---|---|---|---|
| | | State | City | Zip Code | Street Address | Lat | Lng | Date | Time |
| 1 | ABCD5...567 | California | Palo Alto | 94304 | 234 University Avenue | 37.4292 | 122.1381 | 2013/11/23 | 10:32 |
| 2 | CDFA2...695 | California | Sunnyvale | 94085 | 123 Murphy St | Unknown | Unknown | 2013/10/18 | 10:28 |
| 3 | CABB1...555 | California | Palo Alto | 94304 | 123 Main St | Unknown | Unknown | 2013/11/30 | 13:00 |
| 4 | AEDD...123 | California | San Francisco | 94102 | 1000 Lombard St | 37.8019 | 122.4189 | 2013/11/21 | 19:00 |
| 5 | BBCA...527 | Unknown | Unknown | Unknown | Unknown | Unknown | Unknown | 2013/11/03 | 8:03 |
| ... | ... | ... | ... | ... | ... | ... | ... | ... | ... |
| 50,000,000,000 | DCBA1...955 | California | Beverly Hills | 90210 | 123 Wilshire Blvd | 34.0731 | 118.3994 | 2013/10/28 | 14:00 |

FIG. 5

ENTITY DATA ATTRIBUTION USING DISPARATE DATA SETS

CROSS REFERENCE TO RELATED APPLICATION

This application is a continuation of, and claims priority to U.S. patent application Ser. No. 16/209,763, which was filed on Dec. 4, 2018, which application is a continuation of, and claims priority to U.S. patent application Ser. No. 15/209,544, which was filed on Jul. 13, 2016, which claims priority to U.S. Provisional Patent Application No. 62/261,744, which was filed on Dec. 1, 2015, and the disclosures of which are expressly incorporated herein by reference in their entireties.

BACKGROUND

Vast amounts of data are readily available to analysts today, on the one hand allowing them to perform more complicated and detailed data analyses than ever but on the other hand making it more difficult to compare the data to other data sets. Different data sets can contain information relating to the same entities without any effective way of linking the data. The ability to analyze related data stored in multiple data sets can provide great opportunity for better understanding the data as a whole. Analyzing these large and potentially disparate datasets to resolve related data presents computational challenges. The ability to effectively and efficiently link data across disconnected data sets can provide valuable insights not discernible from the individual data sets alone.

BRIEF DESCRIPTION OF THE DRAWINGS

Reference will now be made to the accompanying drawings showing example embodiments of the present application, and in which:

FIG. 4 is a block diagram of an exemplary data structure accessed in the process of analyzing disparate data sets, consistent with the embodiments of the present disclosure.

FIG. 5 is a block diagram of an exemplary data structure accessed in the process of analyzing disparate data sets, consistent with embodiments of the present disclosure.

DETAILED DESCRIPTION OF EXEMPLARY EMBODIMENTS

Figure 1:
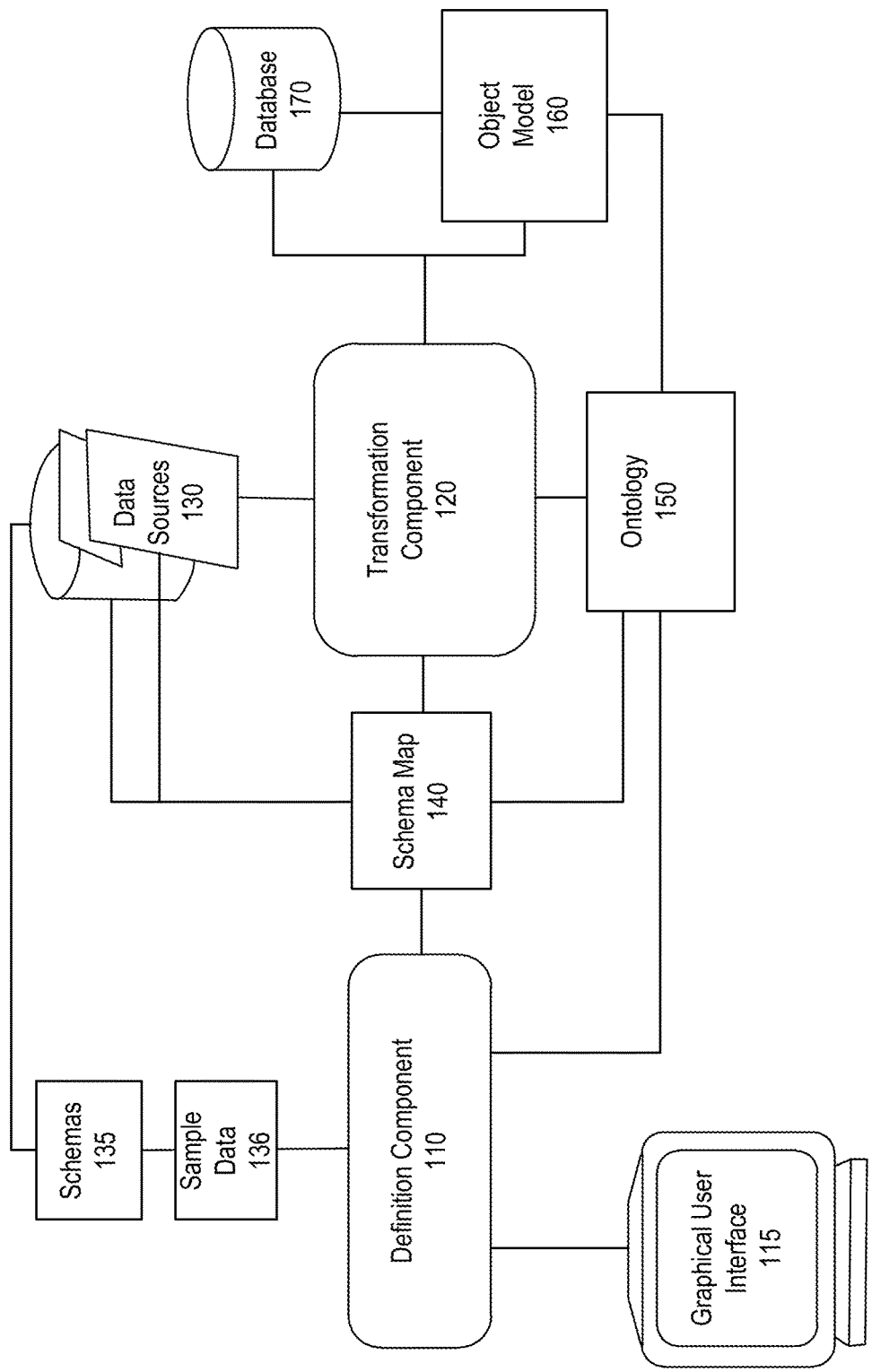
FIG. 1 illustrates, in block diagram form, an exemplary data fusion system for providing data analysis, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts.

Generally, embodiments of the present disclosure relate to analyzing and attributing data in disparate data sets. The data represented by the various data sets can include data regarding interactions between individuals or entities. Large sets of interaction data may be filtered according to selectable criteria to provide, for example, information associated with the location and timing of specific interactions. Such selectable criteria may include an address, geographic coordinates, times of interactions, time spent between interactions, demographics of individuals involved, types of entities or organizations involved, etc. Using attributes of the data in the disparate data sets, embodiments of the present disclosure can determine agreement among the data sets allowing for the determination of related data and entities despite no clear overlap in identification information among the various data sets.

In some embodiments, data can be stored in multiple, disparate data sets. For example data related to an interaction may be stored in one database while information to the circumstances leading to that interaction may be stored in a separate database. Examples of data sets can include location information attached to social media activity, mobile device details, and past interactions. Although stored in separate databases and data sets, this data may contain information that allows for the attribution of data across those databases or data sets that involve common entities or individuals.

In some embodiments, data from the data sets may be processed to determine trajectories that represent data within a data set associated with particular interactions or information involving a single individual or entity. A trajectory can be a representation of actions, attributes, behaviors, and/or records associated with the same entity. When considering multiple interactions or records associated with an entity, trajectories can provide a mechanism for evaluating that entity across those interactions, multiple data records, or multiple data points in a way that does not rely on specific fields in each individual record or attributes associated with each individual data point. By creating trajectories representing an entity, additional insight and information can be obtained that may not be available from analyzing the individual records alone.

Moreover, trajectories can provide an additional data point for comparing and contrasting two or more entities. For example, a data set may include multiple interactions associated with a particular individual. A trajectory associated with these interactions may reveal the individuals movement or behavior. Such a trajectory could be compared or contrasted with similar analysis of other data sets to find commonality or agreement that may indicate that the data sets are associated with the same individual. Trajectories can be created for multiple data sets and many different types of data. Trajectories from different sources that represent similar types of data can be compared to determine if data within the data sets agree. For example, a trajectory for a data set representing online browsing history can be compared to trajectories for a data set involving interactions in an offline context. Trajectories that match can indicate that the two data sets contain information related to the same individual.

In some embodiments the basis for the trajectories can vary based on the type and nature of the data in the data set. For example, the number of matches among trajectories in different data sets needed to determine a positive association can be adjusted based on the characteristics of each data set and the amount of overlap between each data set.

In some embodiments, the analysis may involve location information. When utilizing location information, the trajectory analysis can include specific data points, e.g. specific latitude and longitude coordinates, or can include all locations within a radius of a specific point. Depending on the precision of the underlying data sets, the trajectory analysis can consider varied levels of detail. Additionally, the location information can be generalized. For example, location information could be a city, neighborhood, a state, a zip code, or other similar designation. The level of granularity can depend on the specific application.

Similarly, in some embodiments the analysis may involve date and time information. When utilizing date and time information, the trajectory analysis can include specific dates and times or allow for ranges of dates and times to account for differences in the data that still can refer to a single interaction or event. Similar to location information, the precision used in the trajectory analysis can vary depending on the underlying data. For example, dates and times may be granular to the minute or can be specified at a generic level, such as "a week ago." More or less levels of granularity are possible and the specific requirements of the application can dictate the appropriate levels of granularity.

Additional aspects of embodiments consistent with the present disclosure include implicit and explicit comparisons of data in the disparate data sets. For example, multiple data sets may include the same unique information allowing an explicit attribution of data in one data set with data in another data set. In some embodiments, probabilistic analysis can help determine confidence levels in the precision of trajectory calculations and comparisons. Embodiments consistent with the present disclosure can allow for efficient analysis of large, seemingly unrelated data sets providing accurate attribution of information in the data sets to a common entity or individual. These attributions can provide significant advantages to those consuming the data.

FIG. 1 illustrates, in block diagram form, an exemplary data fusion system 100 for providing data analysis, consistent with embodiments of the present disclosure. Among other things, data fusion system 100 facilitates transformation of one or more data sources, such as data sources 130 (e.g., which can be data systems 210-250 shown in FIG. 2 and described in more detail below) into an object model 160 whose semantics are defined by an ontology 150. The transformation can be performed for a variety of reasons. For example, data can be imported from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. Alternatively, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles Calif." would not be valid for the specified parser definition, but a user could create a second parser definition that does match input data of "Los Angeles Calif." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing a database query.

Schema map 140, ontology 150, and schemas 135 can be stored in any suitable structures, such as XML files, database tables, and so forth. In some embodiments, ontology 150 is maintained persistently. Schema map 140 may or may not be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. Alternatively, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

Throughout this disclosure, reference will be made to an entity such as, for example, a provisioning entity and a consuming entity. It will be understood that a provisioning entity can include, for example, a merchant, a retail provisioning entity or the like, and a consuming entity can include, for example, a consumer user buying products or services from a provisioning entity. It will be understood that a consuming entity can represent either individual persons or can represent a group of persons (e.g., a group of persons living under one roof as part of a family). In some embodiments, a consuming entity can be associated with a credit card number of an individual or a credit card number for an entire family sharing one credit card. It will also be understood that a provisioning entity can represent either the entity itself or individual persons involved with the entity.

In embodiments consistent with the present disclosure, data fusion system 100 can provide processed data from disparate data sources to an analysis system. For example, data stored in different data sets may use a variety of forms for location information. One data set can use address information while another data set can use latitude and longitude. Moreover, different data sets that use address information may store an address as one single entry or divided into logical components such as street number, street name, city, state, and zip code. Data fusion system 100 can provide a mechanism to control data intake and process the data sets to store or provide representations of the data sets that conform to a consistent object model. This can allow an analysis engine to process data in a consistent manner without needing to account for differences in the way data are stored. For example, an analysis engine consistent with embodiments of the present disclosure can calculate trajectories for multiple data sets having location information without needing to account for differences in how the locations are stored in the original data. In these embodiments, data fusion system 100 provides a consistent object model to the analysis engine to allow for data simplified trajectory calculations and comparisons.

Figure 2:
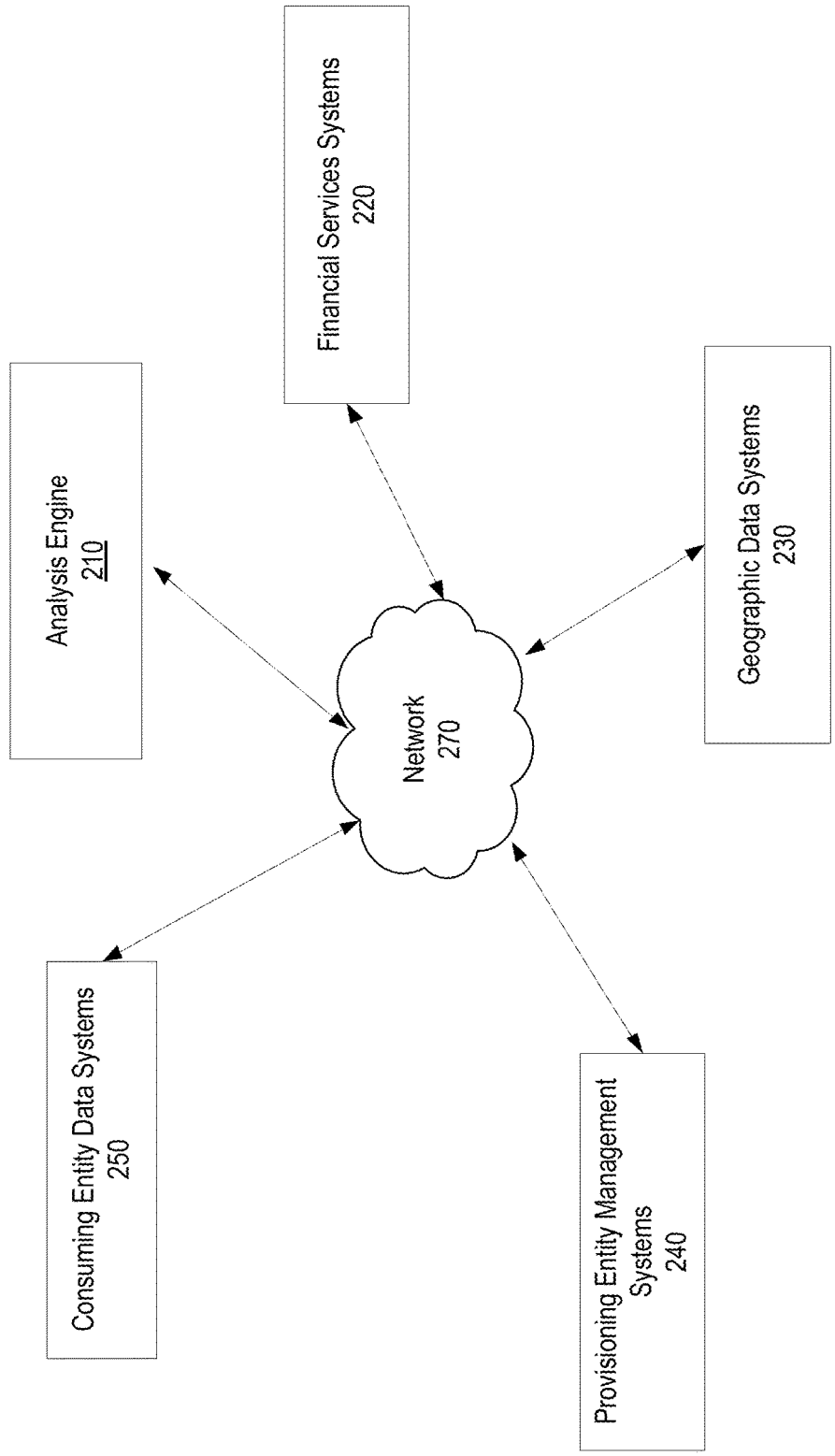
FIG. 2 is a block diagram of an exemplary system for analyzing disparate data sets, consistent with embodiments of the present disclosure.

FIG. 2 is a block diagram of an exemplary system 200 for acquiring and comparing data from disparate data sets, consistent with disclosed embodiments. In some embodiments, system 200 can include analysis engine 210, one or more financial services systems 220, one or more geographic data systems 230, one or more provisioning entity management systems 240, and one or more consuming entity data systems 250. The components and arrangement of the components included in system 200 can vary depending on the embodiment. For example, analysis engine 210 can interact with geographic data systems 230 and financial services systems 220 without using data from the other components. Thus, system 200 can include fewer or additional components that perform or assist in the analysis of data sets One or more components of system 200 can include computing systems configured to provide different types of data. As further described herein, components of system 200 can include one or more computing devices (e.g., computer(s), server(s), etc.), memory storing data and/or software instructions (e.g., database(s), memory devices, etc.), and other appropriate computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including analysis engine 210, one or more financial services systems 220, one or more geographic data systems 230, one or more provisioning entity management systems 240, and one or more consumer entity data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
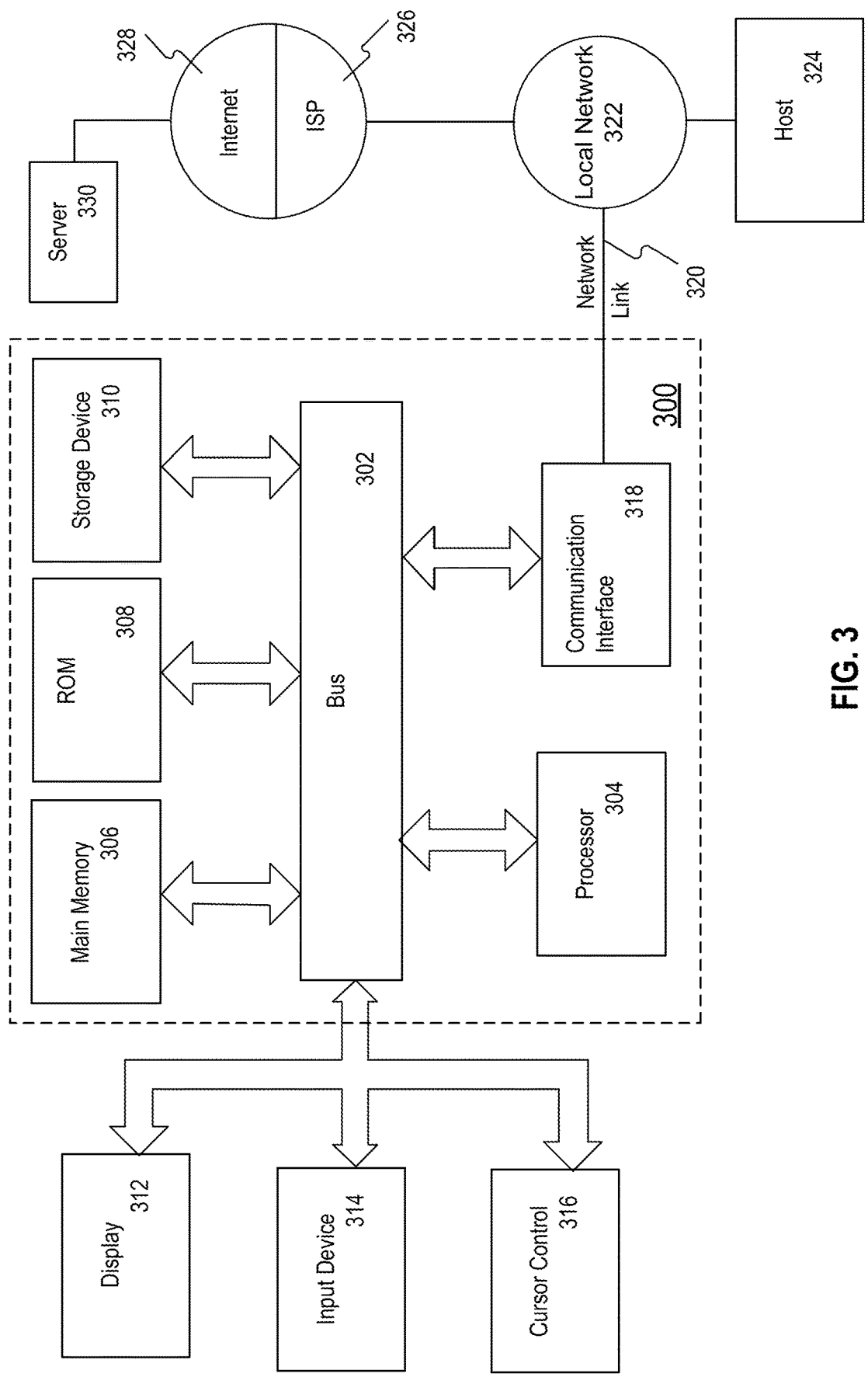
FIG. 3 is a block diagram of an exemplary computer system, consistent with embodiments of the present disclosure.

Analysis engine 210 can be a computing system configured to store, organize and process data sets. For example, analysis engine 210 can be a computer system configured to execute software or a set of programmable instructions that collect or receive financial interaction data, consumer data, and provisioning entity data and process the data to determine related information. Analysis engine 210 can be configured, in some embodiments, to utilize, include, or be a data fusion system 100 (see, e.g., FIG. 1) to transform data from various data sources (such as, financial services systems 220, geographic data systems 230, provisioning entity management systems 240, and consuming entity data systems 250) for processing. In some embodiments, analysis engine 210 can be implemented using a computer system 300, as shown in FIG. 3 and described below.

Analysis engine 210 can include one or more computing devices (e.g., server(s)), memory storing data and/or software instructions (e.g., database(s), memory devices, etc.) and other known computing components. According to some embodiments, analysis engine 210 can include one or more networked computers that execute processing in parallel or use a distributed computing architecture. Analysis engine 210 can be configured to communicate with one or more components of system 200, and it can be configured to consume data sets associated with those systems. It is appreciated that the systems shown in FIG. 2 are illustrative, and other systems may provide data to analysis engine 210.

Financial services system 220 can be a computing system associated with a financial service provider, such as a bank, credit card issuer, credit bureau, credit agency, or other entity that generates, provides, manages, and/or maintains financial service accounts for one or more users. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account interaction data, such as interaction dates, interaction amounts, interaction types, and location of interaction. In some embodiments, each interaction of financial data can include several categories of information associated with the interaction. For example, each interaction can include categories such as number category; consuming entity identification category; consuming entity location category; provisioning entity identification category; provisioning entity location category; type of provisioning entity category; interaction amount category; and time of interaction category, as described in FIG. 4. It will be appreciated that financial data can comprise either additional or fewer categories than the exemplary categories listed above. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as analysis engine 210. For example, geographic data systems 230 can provide geodetic coordinates when provided with a street address or vice-versa. In some embodiments, geographic data systems 230 expose an application programming interface (API) including one or more methods or functions that can be called remotely over a network, such as network 270. In some embodiments, geographic data systems can provide information concerning a radius around a specific point. For example, analysis engine 210 can provide two addresses, and geographic data systems 230 can provide, in response, whether or not one address is within a threshold distance of the other address.

Provisioning entity management systems 240 can include one or more processors configured to execute software instructions stored in memory. Provisioning entity management systems 240 can include software or a set of programmable instructions that when executed by a processor perform known Internet-related communication. For example, provisioning entity management systems 240 can provide and execute software or a set of instructions that provides interfaces to retrieve data stored in provisioning entity management systems 240. The disclosed embodiments are not limited to any particular configuration of provisioning entity management systems 240.

Provisioning entity management systems 240 can be one or more computing systems associated with a provisioning entity that provides products (e.g., goods and/or services), such as a restaurant (e.g., Outback Steakhouse®, Burger King®, etc.), retailer (e.g., Amazon.com®, Target®, etc.), grocery store, mall, shopping center, service provider (e.g., utility company, insurance company, financial service provider, automobile repair services, movie theater, etc.), non-profit organization (ACLU™, AARP®, etc.) or any other type of entity that provides goods, services, and/or information that consuming entities (i.e., end users or other business entities) can purchase, consume, use, etc. For ease of discussion, the exemplary embodiments presented herein that discuss provisioning entities relate to entities whose interactions involve goods and services. Provisioning entity management systems 240, however, are not limited to systems associated with retail provisioning entities that conduct business in any particular industry or field.

Provisioning entity management systems 240 can be associated with computer systems installed and used at a brick and mortar provisioning entity locations where a consumer can physically visit and purchase goods and services. Such locations can include computing devices that perform financial service interactions with consumers (e.g., Point of Sale (POS) terminal(s), kiosks, etc.). Provisioning entity management systems 240 can also include back and/or front-end computing components that store data and execute software or a set of instructions to perform operations consistent with disclosed embodiments, such as computers that are operated by employees of the provisioning entity (e.g., back office systems, etc.). Provisioning entity management systems 240 can also be associated with a provisioning entity that provides goods and/or service via known online or e-commerce types of solutions. For example, such a provisioning entity can sell products via a website using known online or e-commerce systems and solutions to market, sell, and process online interactions. Provisioning entity management systems 240 can include one or more servers that are configured to execute stored software or a set of instructions to perform operations associated with a provisioning entity, including one or more processes associated with processing purchase interactions, generating interaction data, generating product data (e.g., SKU data) relating to purchase interactions, for example.

Provisioning entity management systems 240 can be one or more computing devices configured to provide provisioning entity analysis and data to analysis engine 210. For example, provisioning entity management systems 240 can be a desktop computer, a laptop, a server, a mobile device (e.g., tablet, smart phone, etc.), or any other type of computing device configured to provide data access to analysis engine 210 for data related to the provisioning entity management systems 240. For example, provisioning entity management systems 240 can generate, maintain, store, provide, and/or process financial data associated with one or more merchants or provisioning entities. Provisioning entity data can include, inter alia, customer interaction data that consists of, for example, store visits, individual transaction information, credit card usage, purchase history information, loyalty accounts, service requests, customer service records, transaction locations, and customer information.

Consuming entity data systems 250 can include one or more computing devices configured to provide demographic or other data regarding consumers. For example, consuming entity data systems 250 can provide information regarding the name, address, gender, income level, age, email address, or other information about consumers. Consuming entity data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, advertising agencies, or some other organization that collects and provides demographic data or data about individual consumers. In some embodiments consumer entity data systems 250 can include advertising information related to individual consumers such as, ad views, clicks, ad impressions, ad details, or other advertisement related information. In some embodiments, consumer entity data systems may include web browsing history (e.g., browsing data provided by Apple Safari, Microsoft Internet Explorer, Google Chrome, Mozilla Firefox, or other web browser), social network interactions (e.g., from social networking providers like, among others, Facebook, LinkedIn, and Instagram), or other available online behavior related to a consumer or group of consumers.

Network 270 can be any type of network or combination of networks configured to provide electronic communications between components of system 200. For example, network 270 can be any type of network (including infrastructure) that provides communications, exchanges information, and/or facilitates the exchange of information, such as the Internet, a Local Area Network, or other suitable connection(s) that enables the sending and receiving of information between the components of system 200. Network 270 may also comprise any combination of wired and wireless networks. In other embodiments, one or more components of system 200 can communicate directly through a dedicated communication link(s), such as links between analysis engine 210, financial services system 220, geographic data systems 230, provisioning entity management systems 240, and consuming entity data systems 250.

As noted above, analysis engine 210 can include a data fusion system (e.g., data fusion system 100) for organizing data received from one or more of the components of system 200. Analysis engine 210 can query other components of system 200 and consume information provided by the other components of system 200. Analysis engine can attribute data from one system with data from another system. For example, in some embodiments analysis engine 210 attributes transactions and purchase history from financial services systems 220 with online advertising information from consuming entity data systems 250 to correlate advertisements that lead to purchases in brick-and-mortar stores. Moreover, analysis can combine information stored in multiple data sets associated with each component and/or multiple data sets from different components of system 200.

FIG. 3 is a block diagram of an exemplary computer system 300, consistent with embodiments of the present disclosure. The components of system 200 such as provisioning entity data systems 210, financial service systems 220, geographic data systems 230, provisioning entity management systems 240, and consuming entity data systems 250 may include the architecture based on or similar to that of computer system 300.

As illustrated in FIG. 3, computer system 300 includes a bus 302 or other communication mechanism for communicating information, and one or more hardware processors 304 (denoted as processor 304 for purposes of simplicity) coupled with bus 302 for processing information. Hardware processor 304 can be, for example, one or more general-purpose microprocessors or it can be a reduced instruction set of one or more microprocessors.

Computer system 300 also includes a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, after being stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc. is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 300 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques and other features described herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 310. Volatile media can include dynamic memory, such as main memory 306. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 can also include a communication interface 318 coupled to bus 302. Communication interface 318 can provide a two-way data communication coupling to a network link 320 that can be connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 can send and receives electrical, electromagnetic or optical signals that carry digital data streams representing various types of information.

Network link 320 can typically provide data communication through one or more networks to other data devices. For example, network link 320 can provide a connection through local network 322 to a host computer 324 or to data equipment operated by an Internet Service Provider (ISP) 326. ISP 326 in turn can provide data communication services through the world wide packet data communication network now commonly referred to as the "Internet" 328. Local network 322 and Internet 328 can both use electrical, electromagnetic or optical signals that carry digital data streams. The signals through the various networks and the signals on network link 320 and through communication interface 318, which carry the digital data to and from computer system 300, can be example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution. In some embodiments, server 330 can provide information for being displayed on a display.

FIG. 4 is a block diagram of an exemplary data structure 400, consistent with embodiments of the present disclosure. Data structure 400 can store data records associated with interactions involving multiple entities. Data structure 400 can be, for example, a database (e.g., database 170) that can store elements of an object model (e.g., object model 160). In some embodiments, data structure 400 can be a Relational Database Management System (RDBMS) that stores interaction data as sections of rows of data in relational tables. An RDBMS can be designed to efficiently return data for an entire row, or record, in as few operations as possible. An RDBMS can store data by serializing each row of data of data structure 400. For example, in an RDBMS, data associated with interaction 1 of FIG. 4 can be stored serially such that data associated with all categories of interaction 1 can be accessed in one operation.

Alternatively, data structure 400 can be a column-oriented database management system that stores data as sections of columns of data rather than rows of data. This column-oriented DBMS can have advantages, for example, for data warehouses, customer relationship management systems, and library card catalogs, and other ad hoc inquiry systems where aggregates are computed over large numbers of similar data items. A column-oriented DBMS can be more efficient than an RDBMS when an aggregate needs to be computed over many rows but only for a notably smaller subset of all columns of data, because reading that smaller subset of data can be faster than reading all data. A column-oriented DBMS can be designed to efficiently return data for an entire column, in as few operations as possible. A column-oriented DBMS can store data by serializing each column of data of data structure 400. For example, in a column-oriented DBMS, data associated with a category (e.g., consuming entity identification category 420) can be stored serially such that data associated with that category for all interactions of data structure 400 can be accessed in one operation.

As shown in FIG. 4, data structure 400 can comprise data associated with a very large number of interactions associated with multiple entities. For example, data structure 400 can include 50 billion or more interactions. In some embodiments, interactions associated with multiple entities can be referred to as transactions between multiple entities. Where appropriate, the terms interactions and transactions are intended to convey the same meaning and can be used interchangeably throughout this disclosure. While each interaction of data structure 400 is depicted as a separate row in FIG. 4, it will be understood that each such interaction can be represented by a column or any other known technique in the art. Each interaction data can include several categories of information. For example, the several categories can include, number category 410; consuming entity identification category 420; consuming entity location category 430; provisioning entity identification category 440; provisioning entity location category 450; type of provisioning entity category 460; interaction amount category 470; and time of interaction category 480. It will be understood that FIG. 4 is merely exemplary and that data structure 400 can include even more categories of information associated with an interaction.

Number category 410 can uniquely identify each interaction of data structure 400. For example, data structure 400 depicts 50 billion interactions as illustrated by number category 410 of the last row of data structure 400 as 50,000,000,000. In FIG. 4, each row depicting an interaction can be identified by an element number. For example, interaction number 1 can be identified by element 401; interaction number 2 can be identified by element 402; and so on such that interaction 50,000,000,000 can be identified by 499. It will be understood that this disclosure is not limited to any number of interactions and further that this disclosure can extend to a data structure with more or fewer than 50 billion interactions. It is also appreciated that number category 410 need not exist in data structure 400.

Consuming entity identification category 420 can identify a consuming entity. In some embodiments, consuming entity identification category 420 can represent a name (e.g., User 1 for interaction 401; User N for interaction 499) of the consuming entity. Alternatively, consuming entity identification category 420 can represent a code uniquely identifying the consuming entity (e.g., CE002 for interaction 402). For example, the identifiers under the consuming entity identification category 420 can be a credit card number that can identify a person or a family, a social security number that can identify a person, a phone number or a MAC address associated with a cell phone of a user or family, or any other identifier.

Consuming entity location category 430 can represent location information of the consuming entity. In some embodiments, consuming entity location category 430 can represent the location information by providing at least one of: a state of residence (e.g., state sub-category 432; California for element 401; unknown for interaction 405) of the consuming entity; a city of residence (e.g., city sub-category 434; Palo Alto for interaction 401; unknown for interaction 405) of the consuming entity; a zip code of residence (e.g., zip code sub-category 436; 94304 for interaction 401; unknown for interaction 405) of the consuming entity; and a street address of residence (e.g., street address sub-category 438; 123 Main St. for interaction 401; unknown for interaction 405) of the consuming entity.

Provisioning entity identification category 440 can identify a provisioning entity (e.g., a merchant or a coffee shop). In some embodiments, provisioning entity identification category 440 can represent a name of the provisioning entity (e.g., Merchant 2 for interaction 402). Alternatively, provisioning entity identification category 440 can represent a code uniquely identifying the provisioning entity (e.g., PE001 for interaction 401). Provisioning entity location category 450 can represent location information of the provisioning entity. In some embodiments, provisioning entity location category 450 can represent the location information by providing at least one of: a state where the provisioning entity is located (e.g., state sub-category 452; California for interaction 401; unknown for interaction 402); a city where the provisioning entity is located (e.g., city sub-category 454; Palo Alto for interaction 401; unknown for interaction 402); a zip code where the provisioning entity is located (e.g., zip code sub-category 456; 94304 for interaction 401; unknown for interaction 402); and a street address where the provisioning entity is located (e.g., street address sub-category 458; 234 University Ave. for interaction 401; unknown for interaction 402).

Type of provisioning entity category 460 can identify a type of the provisioning entity involved in each interaction. In some embodiments, type of provisioning entity category 460 of the provisioning entity can be identified by a category name customarily used in the industry (e.g., Gas Station for interaction 401) or by an identification code that can identify a type of the provisioning entity (e.g., TPE123 for interaction 403). Alternatively, type of the provisioning entity category 460 can include a merchant category code ("MCC") used by credit card companies to identify any business that accepts one of their credit cards as a form of payment. For example, MCC can be a four-digit number assigned to a business by credit card companies (e.g., American Express™, MasterCard™, VISA™) when the business first starts accepting one of their credit cards as a form of payment.

In some embodiments, type of provisioning entity category 460 can further include a sub-category (not shown in FIG. 4), for example, type of provisioning entity sub-category 461 that can further identify a particular sub-category of provisioning entity. For example, an interaction can comprise a type of provisioning entity category 460 as a hotel and type of provisioning entity sub-category 461 as either a bed and breakfast hotel or a transit hotel. It will be understood that the above-described examples for type of provisioning entity category 460 and type of provisioning entity sub-category 461 are non-limiting and that data structure 400 can include other kinds of such categories and sub-categories associated with an interaction.

Interaction amount category 470 can represent a transaction amount (e.g., $74.56 for interaction 401) involved in each interaction. Time of interaction category 480 can represent a time at which the interaction was executed. In some embodiments, time of interaction category 480 can be represented by a date (e.g., date sub-category 482; Nov. 23, 2013, for interaction 401) and time of the day (e.g., time sub-category 484; 10:32 AM local time for interaction 401). Time sub-category 484 can be represented in either military time or some other format. Alternatively, time sub-category 484 can be represented with a local time zone of either provisioning entity location category 450 or consuming entity location category 430.

In some embodiments, each interaction data can include categories of information including (not shown in FIG. 4), for example, consuming entity loyalty membership category, consuming entity credit card type category, consuming entity age category, consuming entity gender category, consuming entity income category, consuming entity with children category, product information category, and service information category.

Consuming entity loyalty membership category can represent whether the consuming entity is part of a loyalty membership program associated with a provisioning entity. For example, consuming entity loyalty membership category can represent that the consuming entity is a member of one of Costco™ membership programs including Goldstar Member™, Executive Member™, and Business Member™. Consuming entity credit card type category can represent the type of credit card used by the consuming entity for a particular interaction. For example, consuming entity credit card type category can indicate that the credit card used by the consuming entity for that particular interaction can be an American Express™, MasterCard™, VISA™, or Discover™ card. In some embodiments, consuming entity credit card type category can represent a kind of MasterCard™ (e.g., Gold MasterCard™ or Platinum MasterCard™) used for a particular interaction.

In some embodiments, consuming entity demographic information can be stored in each interaction. For example, consuming entity demographic information can include at least one of: consuming entity age category, consuming entity gender category, consuming entity income category, and consuming entity with children category. In some embodiments, consuming entity age category can represent age information associated with the consuming entity; consuming entity gender category can represent gender information (e.g., Male or Female) associated with the consuming entity; consuming entity income category can represent income information (e.g., greater than $100,000 per year) associated with the consuming entity; and consuming entity with children category can represent whether the consuming entity has any children under 18 or not. For example, if the consuming entity has children under 18, a positive indication can be stored and if the consuming entity does not have children under 18, a negative indication can be stored. In some embodiments, consuming entity with children category can store information representing a number of children associated with the consuming entity.

Product information category can represent information associated with a product that is involved in an interaction. For example, product information category can represent that the product involved in the interaction is a particular type of product based on a stock keeping unit ("SKU") of the product. In some embodiments, the product's SKU can be unique to a particular provisioning entity involved in that particular interaction. Alternatively, product information category can represent the product involved in the interaction with a at least one of a Universal Product Code, International Article Number, Global Trade Item Number, and Australian Product Number. Service information category can represent information associated with a service that is involved in an interaction. For example, service information category can represent that the service involved in the interaction is a particular type of service based on an SKU of the service. It will be appreciated that an SKU can uniquely represent either a product or a service. Some examples of services can be warranties, delivery fees, installation fees, and licenses.

FIG. 5 is a block diagram of an exemplary data structure 500, consistent with embodiments of the present disclosure. Data structure 500 can store data records associated with interactions involving multiple entities, similarly to data structure 400. As with data structure 400, data structure 500 can be, for example, a database (e.g., database 170) that can store elements of an object model (e.g., object model 160). In some embodiments, data structure 500 can be an RDBMS that stores interaction data as sections of rows of data in relational tables. An RDBMS can be designed to efficiently return data for an entire row, or record, in as few operations as possible. An RDBMS can store data by serializing each row of data of data structure 500. For example, in an RDBMS, data associated with interaction 1 of FIG. 5 can be stored serially such that data associated with all categories of interaction 1 can be accessed in one operation. Alternatively, as with data structure 400, data structure 500 can be a column-oriented database management system that stores data as sections of columns of data rather than rows of data.

As shown in FIG. 5, data structure 500 can comprise data associated with a very large number of interactions associated with multiple entities. For example, data structure 500 can include 50 billion or more interactions. In some embodiments, interactions associated with multiple entities can be referred to as transactions between multiple entities. As with data structure 400, while each interaction of data structure 500 is depicted as a separate row in FIG. 5, it will be understood that each such interaction can be represented by a column or any other known technique in the art. Each interaction data can include several categories of information. For example, the several categories can include number category 510; identifier category 520; location category 530; and time of interaction category 540. It will be understood that FIG. 5 is merely exemplary and that data structure 500 can include even more categories of information associated with an interaction.

Number category 510 can uniquely identify each interaction of data structure 500. For example, data structure 500 depicts 50 billion interactions as illustrated by number category 510 of the last row of data structure 500 as 50,000,000,000. In FIG. 5 each row depicting an interaction can be identified by an element number. For example, interaction number 1 can be identified by element 501; interaction number 2 can be identified by element 502; and so on such that interaction 50,000,000,000 can be identified by 599. It will be understood that this disclosure is not limited to any number of interactions and further that this disclosure can extend to a data structure with more or fewer than 50 billion interactions. It is also appreciated that number category 510 need not exist in data structure 500.

Identifier category 520 can identify a consuming entity. In some embodiments consuming identifier category 520 can represent a name or code uniquely identifying a consuming entity. For example, identifier category can represent a unique identifier such as an Identifier for Advertisers ("IDFA"), Globally Unique Identifier ("GUID"), Universally Unique Identifier ("UUID"), Media Access Control (MAC) address, or some other unique identifier. These identifiers can be stored as hexadecimal strings (e.g., ABCD5 . . . 567 for interaction 501; DCBA1 . . . 955 for Interaction 599). In some embodiments, the identifiers under the consuming entity identifier category 520 can be a credit card number that can identify a person or a family, a social security number that can identify a person, a phone number or a MAC address associated with a cell phone of a user or family, or any other identifier. Although consumer identifier category 520 comprises unique types of data, interactions involving common entities can share an identifier. In this way, data structure 500 can store multiple discrete interactions corresponding to a specific consumer identifier.

Consuming entity location category 530 can represent location information of the consuming entity. In some embodiments, consuming entity location category 530 can represent the location information by providing at least one of: a state of residence (e.g., state sub-category 532; California for element 501; unknown for interaction 505) of the consuming entity; a city of residence (e.g., city sub-category 534; Palo Alto for interaction 501; unknown for interaction 505) of the consuming entity; a zip code of residence (e.g., zip code sub-category 536; 94304 for interaction 501; unknown for interaction 505) of the consuming entity; a street address of the interaction (e.g., street address sub-category 538; 234 University Avenue for interaction 501; unknown for interaction 505); a latitude of the interaction (e.g., lat sub-category 537; 37.4292 for interaction 501; unknown for interaction 505); a longitude of the interaction (e.g., lng sub-category 539; 122.1381 for interaction 501; unknown for interaction 505) of the consuming entity.

In some embodiments, the data in location category 530 may be inferred from other data instead of being directly provided. For example, a consumer entity can provide her location on social media platforms such as Twitter, FourSquare, LinkedIn, Facebook, or other similar platforms. Location information posted on these social media platforms can be imprecise. For example, a tweet posted on Twitter may provide only the name of a restaurant. In another example, a tweet may include generic location information such as "Near Meatpacking," In some embodiments the location information provided can be used directly without further processing or analysis. In other embodiments, more specific location information for the named restaurant can be obtained by comparing the restaurant to data systems containing location information for known restaurants (e.g., geographic data systems 230). If multiple restaurants have the same name, or if a restaurant has multiple locations, additional social media platform posts from the same consumer entity can help identify the specific location by providing a grouping of locations occurring within a short time period or locations that are frequented. The embodiments described can determine the necessary level of aggregation for the location information and the detail that is calculated and/or stored can depend on the specific application.

In some embodiments, time of interaction category 540 can be represented by a date (e.g., date sub-category 542; Nov. 23, 2013, for interaction 501) and time of the day (e.g., time sub-category 544; 10:32 AM local time for interaction 501). Time sub-category 584 can be represented in either military time or some other format. Alternatively, time sub-category 584 can be represented with a local time zone of consuming entity location category 530. Similarly to data for location category 530, time category 540 can be inferred from other available data sources. For example, a tweet from a specific location may be presented on Twitter as occurring a specific number of minutes or hours ago. From this information, an approximate time and/or date can be inferred and entered into date sub-category 542 and time sub-category 544. Similarly to the location information described above, in some embodiments the time of interaction category can be used directly as provided. For example, a tweet may indicate that it was posted "One Week Ago." In some embodiments, no additional resolution of the specific time is computed and the time information, as provided, can be used for date sub-category 542 and time sub-category 544. As with location information, the embodiments described can determine the appropriate level of detail for time sub-category 542 and date sub-category 544 based on the specific application and can adjust the level of detail to meet specific needs.

Data structure 500 can represent multiple types of information. In one embodiment, data structure 500 can represent online advertising information. In some embodiments, data structure 500 can further include a product information category to identify an advertised product. In some embodiments data structure 500 may represent types of data such as mobile device location information, social media interactions, or consumer transaction information. Data structure 500 can include additional categories and sub-categories (not picture in FIG. 5) specific to the various types of data that data structure 500 can represent.

Data structures 400 and 500, as shown in FIGS. 4 and 5 can exist in one or more of financial services systems 220, geographic data systems 230, provisioning entity management systems 240, or consuming entity data systems 250. These data structures can be made available to analysis engine 210 for processing.

Figure 6:
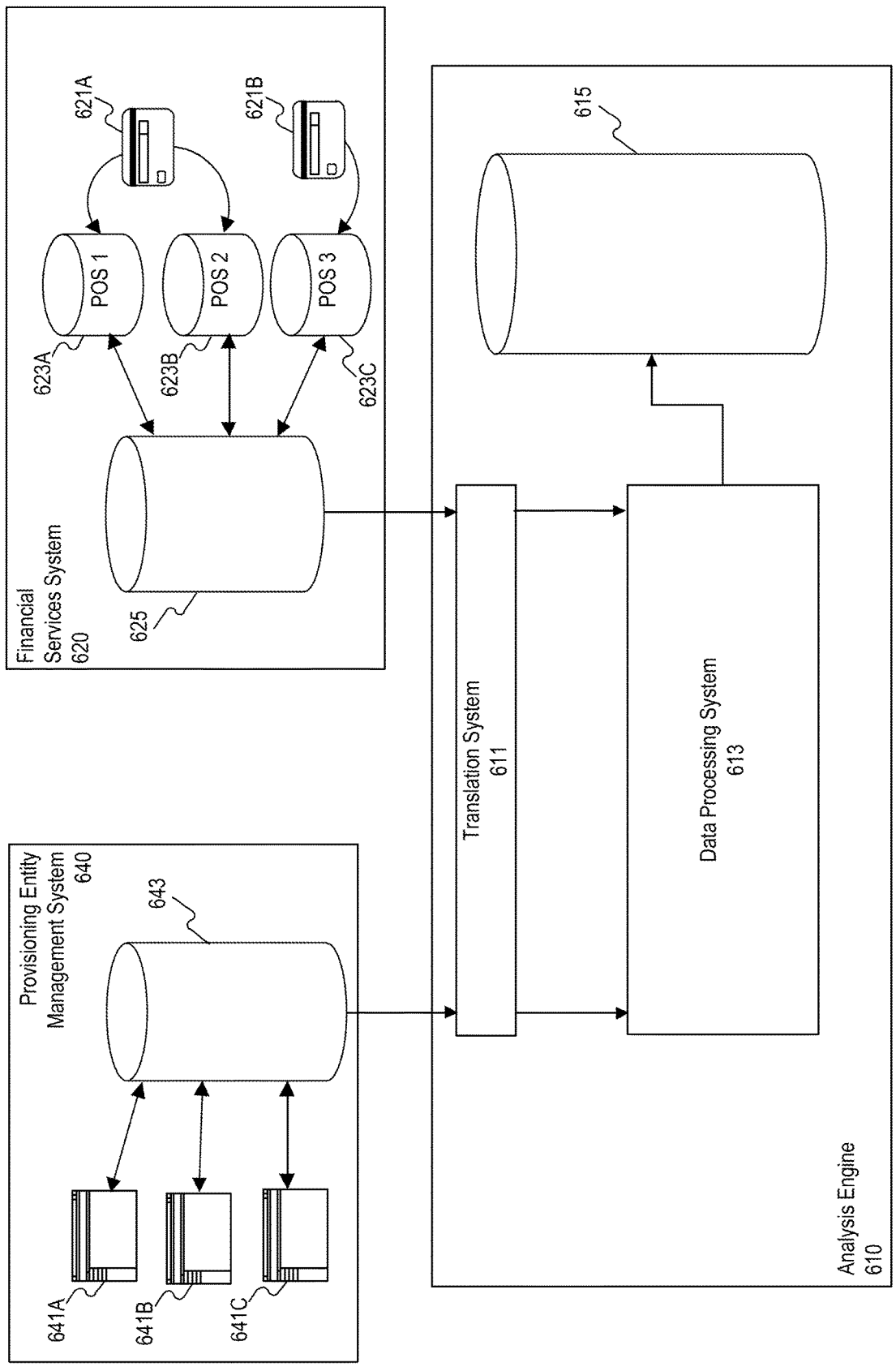
FIG. 6 is a block diagram of an exemplary system for data attribution and analysis using disparate data sets, consistent with the embodiments of the present disclosure.

FIG. 6 is a block diagram of system 600, consistent with embodiments of the present disclosure for attributing data from disparate data sets to a common entity. System 600 can include provisioning entity management system 640, financial services system 620, and analysis engine 610 which can be embodiments of provisioning entity management systems 240, financial services systems 220, and analysis engine 210 respectively. Provisioning entity management system 640 and financial services system 620 can provide disparate data sets to analysis engine 610 for attribution. It is appreciated that provisioning entity management system 640 and financial services system 620 can each provide multiple data sets. Moreover, system 600 can include additional sources of data.

Provisioning entity management system 640 can represent an online advertising system. Web pages 641A-C can include online advertisements. The advertisements can be displayed through a desktop web browser such as Google Chrome, Apple Safari, or Microsoft's Internet Explorer, or the advertisements may be displayed through a web browser on a mobile device or tablet. The advertisements that are displayed may provide analytic data to the provisioning entity management system 640 responsible for providing the advertisements. In some embodiments, the advertisement can make use of a system such as IDFA to track the ad placement. Information about the ad placement can be stored in database 643. Provisioning entity management system 640 can store database 643 in a memory such as main memory 306 or storage device 310 shown in FIG. 3. The data stored in database 643 can be represented by data structure 500 as shown in FIG. 5. Data stored in database 643 can include data describing multiple advertisements shown to the same consumer entity represented by a single IDFA.

Moreover, data structure 500 can include more than one type of data. Provisioning entity management system 640 can include location data along with the advertisement data (e.g., location category 530 of data structure 500). In these embodiments, the IDFA represented in identifier category 520 can also represent a unique mobile device. Location category 530 and time category 540 of data structure 500 can further indicate the location of the consuming entity at the time the advertisement was viewed. Accordingly, all of this information can be provided to analysis engine 610.

Financial services system 620 can represent an interaction system for processing and storing transactions. Point of Sale ("POS") terminals 623A-C can accept and process credit cards 621A-B. In some embodiments, a single credit card (e.g., credit card 621A) can be used at multiple POS systems (e.g., POS 623A and POS 623B. Data related to transactions processed by POS 623A-C can be stored in database 625. Financial services system 620 can store database 625 in a memory such as main memory 306 or storage device 310. The data stored in database 643 can be represented by data structure 400 as shown in FIG. 4.

Analysis engine 610 can analyze data provided by Provisioning Entity Management System 640 and Financial Services System 620. As previously described, analysis engine 610 can implemented using a data fusion system such as data fusion system 100. Analysis engine 610 can include translation system 611. Translation system 611 can process the data provided by Financial Services System 620 and Provisioning Entity Management System 640 according to the above description of data fusion system 100. Translation system 611 can store the processed data as a consistent object model 160. Translation system 611 can provide the processed data to data processing system 613.

Data processing system 613 can analyze the disparate data sets provided by provisioning entity management system 640 and financial services system 620 through translation system 611. Data processing system 613 can further process the data from each individual data set (e.g., the data set provided by provisioning entity management system 640 and financial services system 620 respectively) to determine overlapping patterns in each data set that may indicate that data in the multiple data sets refer to the same user, individual, or consuming entity.

In some embodiments, data processing system 613 can directly map one data set onto another data set. For example if both the data set from provisioning entity management system 640 and from financial services system 620 contain credit card information, data processing system 613 can explicitly attribute consumer entities in one data set with consumer entities in the other data set by attributing rows based on the unique credit card number. In this example, data processing system 613 may update either data set based on the attributed information in the other data set.

In some embodiments, explicit attribution is unavailable and other methods of attribution, such as trajectories, can be used. Trajectories can represent data in a data set that refers to the same entity. For example, as shown in FIG. 4, entries 401 and 403 both refer to "User 1" in the consuming entity identification category 420. Similarly, entries 404 and 405 can refer to "User 3" This can indicate that entries 401 and 403 are two transactions for the same consumer. As previously stated, in some embodiments, the consuming entity identification category can be a credit card number or identifier. Using the information in entries 401 and 403, for example, data processing system 613 can create a trajectory that represents the user and includes the location and time of each entry. In some embodiments, more information can be included in the trajectory, such as the interaction amount or type of provisioning entity.

As shown in FIG. 5, entries 501 and 505 contain the same identifier category value. This value can, for example, represent a mobile device identifier. Data structure 500 of FIG. 5 can represent data provided to data processor 613 in FIG. 6. As was done with entries 401 and 403 of data structure 400 of FIG. 4, data processing system 613 can create a trajectory using the information that refers to entries 501 and 505. This trajectory can include the location and time categories and can represent locations where the mobile device was located.

After data processor 613 has calculated trajectories for the provided data (e.g., data structure 400 of FIG. 4 and data structure 500 of FIG. 5), data processor 613 can compare all of the calculated trajectories to search for agreement among the data sets. Agreement can refer to trajectories that contain similar or identical information. For example, the trajectory for entries 401 and 403 of FIG. 4 and the trajectory for 501 and 505 of FIG. 5 will both contain a reference to location "234 University Avenue" at 10:32. Further, in this example, the trajectory for entries 401 and 403 can contain a reference to a transaction on date 2013/11/21 at 19:00 and the trajectory for entries 501 and 505 can contain a reference to a location on 2013/11/21 at 19:00. The agreement between references of the two trajectories can indicate that "User 1" of FIG. 4 is attributable to the locations for identifier "ABCD5 . . . 567" of FIG. 5.

After determining trajectories that agree among the provided data sets, data processor can attribute data in one data set with data in the other data set according to the overlapping trajectories. This attribution can then allow for data entries in both data sets that were not part of the overlapping trajectories to be associated with each other because they share a common unique identifier with data that has been attributed. This attribution can also allow for completion of the data sets. For example, following attribution of "User 1" to identifier "ABCD5 . . . 567" in the previous example, entry 403 of FIG. 4 can be updated to include the location indicated in entry 505 of FIG. 5.

The level of agreement achievable among data sets can vary greatly with the nature of the data. The general uniqueness of entries in the database can be referred to as the data sets unicity. A high unicity indicates that there is little overlap of data across multiple individual entities in a data set. In some embodiments, data sets having high levels of unicity can provide sufficient levels of agreement with less overlap among trajectories. Data sets having lower levels of unicity may require more agreement among the data set trajectories before data processing system 613 can affirmatively determine that two trajectories refer to the same entity. After calculation of the trajectory matches, data processing 613 can analyze the resulting agreement and determine how many trajectories in each data set agree with multiple different identities in the other data sets. If a trajectory in the first data set agrees with multiple trajectories in the second data set, data processing 613 can determine that the agreement is not reliable for affirmatively matching specific entities in each data set.

Data processing system 613 can adjust different variables to affect the confidence in the resulting agreements. For example, data processing system 613 can set a threshold value of the number of references included in each trajectory. Increasing the threshold value can provide higher levels of confidence in the resulting agreement, but may provide a lower number of attributable entities. This may be necessary for data sets having a low level of unicity. Conversely, decreasing the threshold number can provide a higher number of attributable entities, but may reduce the confidence that the agreement among trajectories uniquely correlates entities in both data sets.

Moreover, aspects of the underlying data used in the trajectories can provide additional mechanisms to control the trajectory comparisons. For example, instead of data processing system 613 requiring specific location matches, data processing system can use generic or imprecise locations in the trajectory calculations. For example, the location can be specified as, among other things, a city block, a city, a town, a general area, a point described in relation to distance or proximity to another place, or a radial location. A location can include a radius of a certain threshold distance around the location or area specified in the data record. In this example, a second location within a certain radial distance from the first location can be considered a location match.

In some embodiments, trajectories based on time and dates can include a time or date span instead of a specific date and time. In these embodiments, data processing system 613 can adjust for records that refer to the same entity but include differences in the data sets that are attributable to factors such as, for example, the methods of recording or data collection. Moreover, trajectories based on time and dates may, similarly to location data, use imprecise or generic data as part of the trajectory calculations. For example, time information such as "around 9 AM" that may or may not also include day information can be used when calculating trajectories. In some embodiments, time or date ranges can contribute to the trajectory calculations. As previously discussed, data of varying levels of specificity can be included in the trajectory calculations.

In some embodiments data processing system 613 can further analyze the trajectories and data sets to determine the reliability of the resulting attributions. Data processing system 613 can perform a probabilistic analysis of records in the data sets to determine if the number of attributable matches resulting from the trajectory analysis is significantly more than would occur from a random sampling. This probabilistic analysis can provide a relative confidence in the trajectory analysis for a particular set of data sets. Based on the analysis, changes in the underlying attributes of the analysis can alter the accuracy of the attribution.

After data processing system 613 makes an attribution of entities represented in each data set, future updates in either data set can also correlated based on the original attribution. Data processing system 613 can store the attribution information in database 615 for future analysis and updates.

Figure 7:
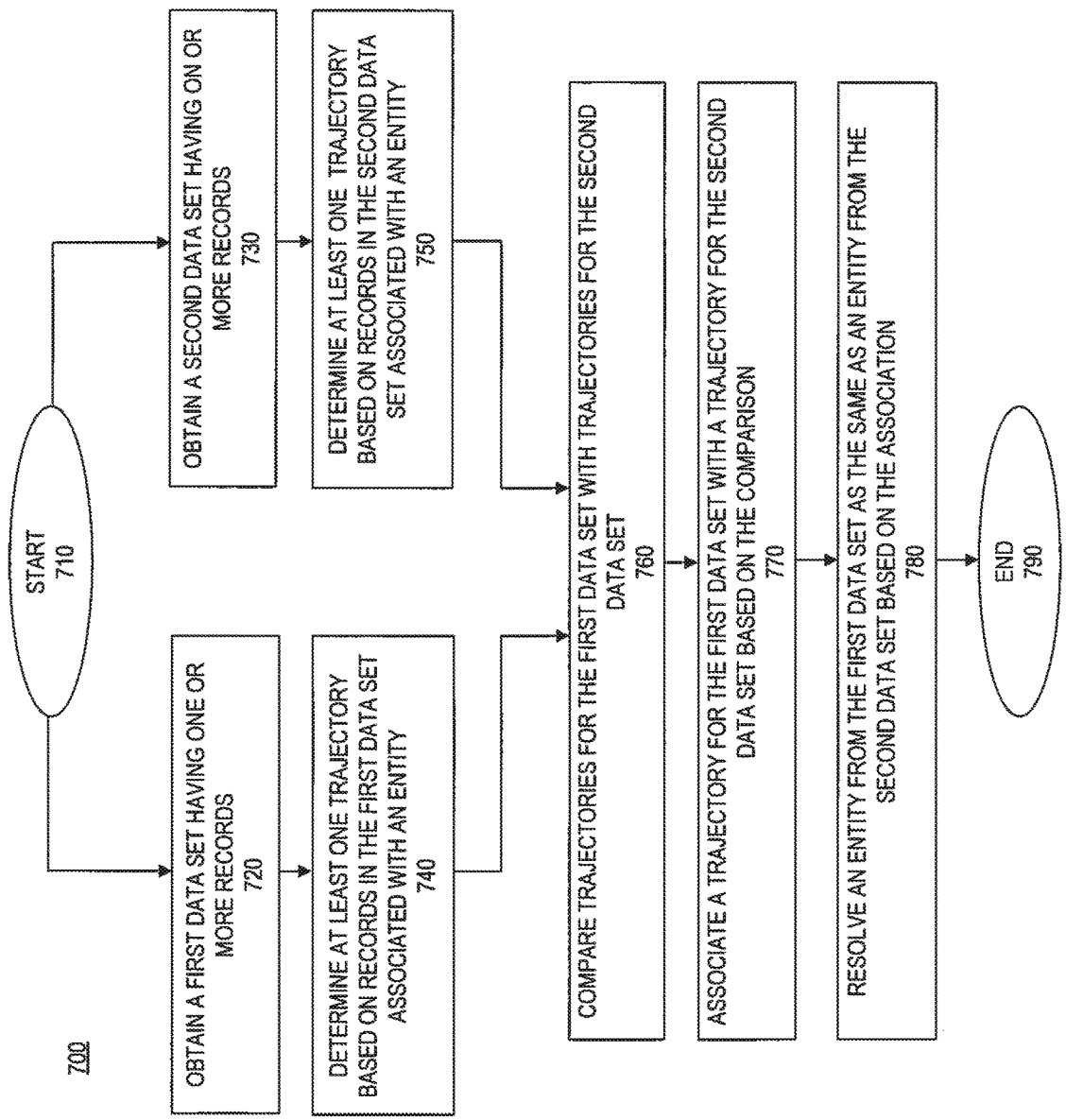
FIG. 7 is a flowchart representing an exemplary process for data attribution and analysis using disparate data sets, consistent with embodiments of the present disclosure.

FIG. 7 is a flowchart representing an exemplary attribution process 700 for resolving data attributed to a single entity consistent with embodiments of the present disclosure. It will be readily appreciated that the illustrated procedure can be altered to delete steps or further include additional steps. Flowchart 700 starts at step 710. Attribution process 700 can obtain a first data set (step 720) and obtain a second data set (step 730). Each data set can consist of multiple records of data and each record of data can be associated with a particular entity. In some embodiments, each data set can contain multiple records associated with a single entity. Moreover, records in each data set can be associated with the same entity. For example, the first data set can represent location information related to mobile devices. Multiple records in the data set can represent the location of a specific device at multiple points in time. Further, for example, the second data set can represent financial transactions including credit card information. Similarly to the first data set, in this example, multiple records can refer to separate transactions using the same credit card.

After obtaining the data sets, attribution process 700 can determine at least one trajectory (step 740) based on records in the first data set and can determine at least one trajectory (step 750) based on records in the second data set. Each trajectory can be representative of records in its respective data set that are associated with the same entity. The trajectories can represent specific elements of multiple records in the data set. For example, a trajectory can represent multiple locations associated with the same entity or multiple time entries associated with the same entity. Further, in some embodiments, the trajectories can represent the locations, dates, times, amounts, or other details about multiple transaction records for a single credit card. Moreover, the values represented in the trajectories can vary depending on the specific data sources and applications. For example, location based trajectories can include radial areas instead of only including specific coordinates. As another example, dates and times in a trajectory can include a date and/or time range instead of only a specific date and time.

After determining trajectories for both data sets, attribution process 700 can compare (step 760) the trajectories across the data sets as previously described in reference to FIG. 6. Attribution process 700 can associate (step 770) trajectories across the data sets that share similar elements. For example a trajectory for the first data set that references multiple locations may be associated with a trajectory for the second data set that references the same locations in the same order. Attribution process 700 can compare trajectories much faster than other comparison systems that consider the entirety of each of the data sets and their records. The improved performance can allow comparisons of large data sets through their trajectories much more efficiently than previously possible.

After associations are made, attribution process 700 can resolve (step 780) an entity represented by records in the first data set with an entity represented by records in the second data set based on the associations made in step 770. In this way, attribution process 700 attributes data records in multiple sets of data to the same underlying entity. In doing so, consumers of the data sets can make better use of information that was previously unknown and unobtainable.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein

What is claimed is:

1. A system for attributing data to entities using disparate data sets, the system comprising:
   a memory device configured to store a set of instructions; and
   one or more processing devices configured to execute the set of instructions to perform operation that include:
   receiving a set of records at a database that comprises a plurality of records, the set of records associated with an entity and comprising a set of data attributes;
   determining a first trajectory associated with the entity based on the set of data attributes of the set of records, the first trajectory indicating a behavior associated with the entity;
   identifying a second trajectory among the plurality of records of the database, the second trajectory comprising a set of matching records that indicate the behavior associated with the entity; and
   attributing the set of matching records to the entity associated with the set of records in response to the identifying the second trajectory that indicates the behavior associated with the entity.

2. The system of claim 1, wherein the attributing the set of matching records to the entity further comprises:
   determining that a number of records among the set of matching records transgresses a threshold value; and
   attributing the set of matching records between the plurality of records of the database and the set of records to the entity associated with the set of records in response to the determining that the number of records among the set of matching records transgresses the threshold value.

3. The system of claim 1 wherein the set of records include an identifier that identifies the entity.

4. The system of claim 1 wherein the set of records comprise transaction data, social network data, consumer data, provisioning data, and product data.

5. The system of claim 1, wherein the identifying a second trajectory records includes:
   determining a first unicity of the set of records;
   determining a second unicity of the set of matching records; and
   performing a comparison of the first unicity and the second unicity.

6. The system of claim 3, wherein the attributing the set of matching records to the entity associated with the set of records includes:
   assigning the identifier that identifies the entity to the set of matching records.

7. A method comprising:
   receiving a set of records at a database that comprises a plurality of records, the set of records associated with an entity and comprising a set of data attributes;
   determining a first trajectory associated with the entity based on the set of data attributes of the set of records, the first trajectory indicating a behavior associated with the entity;
   identifying a second trajectory among the plurality of records of the database, the second trajectory comprising a set of matching records that indicate the behavior associated with the entity; and
   attributing the set of matching records to the entity associated with the set of records in response to the identifying the second trajectory that indicates the behavior associated with the entity.

8. The method of claim 7, wherein the attributing the set of matching records to the entity further comprises:
   determining that a number of records among the set of matching records transgresses a threshold value; and
   attributing the set of matching records between the plurality of records of the database and the set of records to the entity associated with the set of records in response to the determining that the number of records among the set of matching records transgresses the threshold value.

9. The method of claim 7, wherein the set of records include an identifier that identifies the entity.

10. The method of claim 7, wherein the set of records comprise transaction data, social network data, consumer data, provisioning data, and product data.

11. The method of claim 7, wherein the identifying a second trajectory includes:
    determining a first unicity of the set of records;
    determining a second unicity of the set of matching records; and
    performing a comparison of the first unicity and the second unicity.

12. The method of claim 9, wherein the attributing the set of matching records to the entity associated with the set of records includes:
    assigning the identifier that identifies the entity to the set of matching records.

13. A non-transitory computer-readable storage medium storing instructions that, when executed by one or more processors of a machine, cause the machine to perform operations comprising:
    receiving a set of records at a database that comprises a plurality of records, the set of records associated with an entity and comprising a set of data attributes;
    determining a first trajectory associated with the entity based on the set of data attributes of the set of records, the first trajectory indicating a behavior associated with the entity;
    identifying a second trajectory among the plurality of records of the database, the second trajectory comprising a set of matching records that indicate the behavior associated with the entity; and
    attributing the set of matching records to the entity associated with the set of records in response to the identifying the second trajectory that indicates the behavior associated with the entity.

14. The non-transitory machine-readable storage medium of claim 13, wherein the attributing the set of matching records to the entity further comprises:
    determining that a number of records among the set of matching records transgresses a threshold value; and attributing the set of matching records between the plurality of records of the database and the set of records to the entity associated with the set of records in response to the determining that the number of records among the set of matching records transgresses the threshold value.

15. The non-transitory machine-readable storage medium of claim 13, wherein the set of records include an identifier that identifies the entity.

16. The non-transitory machine-readable storage medium of claim 13, wherein the set of records comprise transaction data, social network data, consumer data, provisioning data, and product data.

17. The non-transitory machine-readable storage medium of claim 13, wherein the identifying a second trajectory includes:
- determining a first unicity of the set of records;
- determining a second unicity of the set of matching records; and
- performing a comparison of the first unicity and the second unicity.

* * * * *